United States Patent [19]

Sato et al.

[11] 4,456,192
[45] Jun. 26, 1984

[54] MAGNETIC TAPE CLAMPING DEVICE

[75] Inventors: Takateru Sato; Haruo Shiba, both of Tokyo, Japan

[73] Assignee: TDK Electronics Co., Ltd., Tokyo, Japan

[21] Appl. No.: 341,122

[22] Filed: Jan. 20, 1982

[30] Foreign Application Priority Data

Mar. 20, 1981 [JP] Japan .............................. 56-38219[U]

[51] Int. Cl.³ .......................................... B65H 75/28
[52] U.S. Cl. ................................................. 242/74.1
[58] Field of Search ............ 242/74.1, 74, 125, 125.1, 242/74.2

[56] References Cited

U.S. PATENT DOCUMENTS

| | | | |
|---|---|---|---|
| 3,195,828 | 7/1965 | Kuckhoff et al. | 242/74.1 |
| 3,661,345 | 5/1972 | Ritz, Jr. et al. | 242/74.1 X |
| 3,960,338 | 6/1976 | Shapley | 242/74.1 |
| 3,990,733 | 11/1976 | Shiba et al. | 242/74 |
| 4,181,272 | 1/1980 | Shiba et al. | 242/74.1 |
| 4,290,562 | 9/1981 | Sasaki et al. | 242/74 |
| 4,300,729 | 11/1981 | Oishi et al. | 242/74.1 |
| 4,341,358 | 7/1982 | Shoji | 242/74.1 |
| 4,360,173 | 11/1982 | Shoji | 242/74 X |

FOREIGN PATENT DOCUMENTS 2559582  9/1977  Fed. Rep. of Germany ..... 242/74.1

Primary Examiner—Stanley N. Gilreath
Attorney, Agent, or Firm—Oblon, Fisher, Spivak, McClelland & Maier

[57] ABSTRACT

A magnetic tape clamping device of a reel hub is formed by a clamping piece having projections at the both ends and a concave portion formed on the periphery of the reel hub in which an undercut portion is formed in each side wall of the concave portion so that an increased clamping force is applied between the projections of the clamping piece and legs formed by undercut portions when a magnetic tape is pulled.

1 Claim, 5 Drawing Figures

MAGNETIC TAPE CLAMPING DEVICE

BACKGROUND OF THE INVENTION

1. Field of the Invention:

The present invention relates to a reel hub for a magnetic tape cassette. More particularly, it relates to a magnetic tape clamping device of a reel hub for clamping a magnetic tape or a leader tape.

2. Description of the Prior Art:

The conventional reel hub for a magnetic tape cassette has a clamping device for holding the end of a magnetic tape or a leader tape around the reel hub. FIGS. 1 and 2 illustrate a conventional reel hub in which a clamping device (4) is provided in a portion of the periphery of the reel hub (1). The reel hub (1) has a central opening (2) provided with projections (3) for engaging with the projections of a driving shaft. The magnetic tape clamping device (4) has a concave portion (5) formed in the circumference of the reel hub (1) and a clamping piece (7). Recesses (6) are respectively formed in both side walls (the front and rear walls in view of the rotating direction) of the concave portion (5) into which a resilient clamping piece (7) having the right and left projections (8) is fitted.

FIG. 3 illustrates another conventional reel hub having a circular concave portion into which a clamping piece (10) having a circular cross section is fitted.

In either case, the end portion of the magnetic tape or the leader tape T is clamped between the concave portion (5) or (9) and the clamping piece (7) or (10).

In the conventional reel hub having the structure described above, when a large pulling force is applied to the magnetic tape T, the clamping piece as shown in FIGS. 1 and 2 is bent to possibly cause detachment of the tape. In fact, such a trouble has been sometimes reported. The reel hub shown in FIG. 3 requires a high dimensional accuracy. A reel hub poor in accuracy is useless and it is difficult to produce a highly accurate product. If the magnetic tape clamping device is too loose, the magnetic tape is easily released and the clamping device is too tight, the tape is easily cut during the clamping operation.

A magnetic tape clamping device in which the side walls of the concave portion of the reel hub is formed elastic and a clamping piece is fitted into the concave portion to clamp a tape by utilizing elasticity is proposed in Japanese Examined Publication No. 30929/1970. In the magnetic tape clamping device, however, the elastic wall of the concave portion causes a deformation in the direction away from the magnetic tape when the tape is strongly pulled. Thus the conventional clamping device could not provide a sufficient retaining function.

SUMMARY OF THE INVENTION

It is an object of the present invention to overcome the disadvantage of the conventional reel hub and to provide a reel hub having a structure for retaining a magnetic tape with a sufficient clamping function when the tape is pulled.

The foregoing and the other objects of the present invention have been attained by providing a magnetic tape clamping device of a reel hub comprising a concave portion formed on the periphery of the reel hub in which a recess is respectively formed in both side walls of the concave portion, and a clamping piece having projections for fitting into the recess to clamp the end of a magnetic tape or lead tape, wherein at least one side wall of the concave portion is provided with an undercut portion near or in the recess to form an elastically deformable leg so as to receive the projection of the clamping piece for clamping the magnetic tape.

DETAILED DESCRIPTION OF THE PREFERRED EMBODIMENTS

Figure 1:
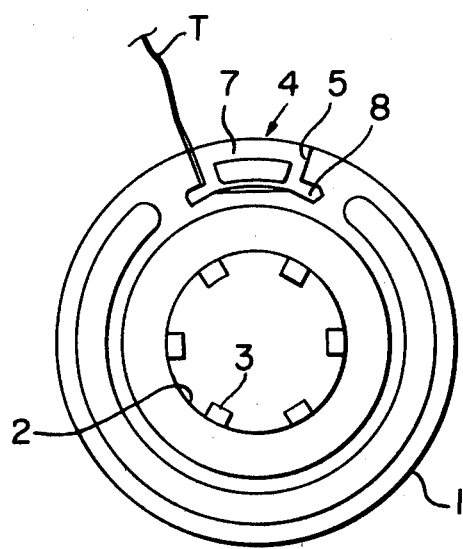
FIG. 1 is a front view of the conventional reel hub.
Figure 2:
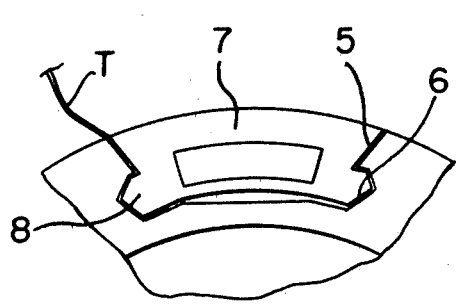
FIG. 2 is an enlarged front view of a portion of the reel hub shown in FIG. 1.
Figure 3:
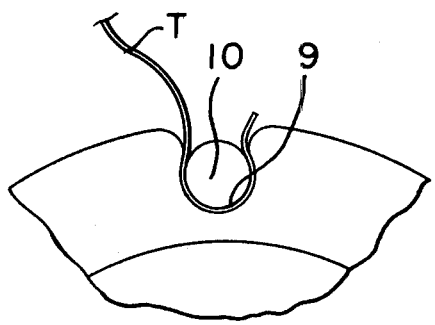
FIG. 3 is a similar view of another embodiment of the conventional reel hub.
Figure 4:
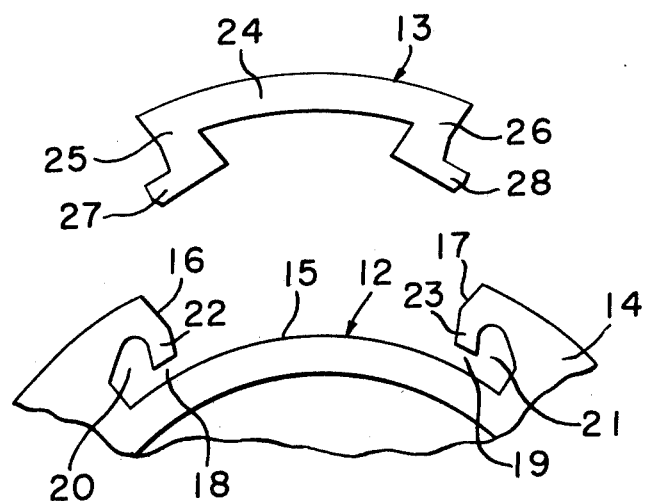
FIG. 4 is a partial front view of a disassembled embodiment of the magnetic tape clamping device of a reel hub of the present invention.

An embodiment of the magnetic tape clamping device of the present invention will be described with reference to FIGS. 4 and 5.

A clamping device (11) is formed by a concave portion (12) recessed from the circumference of a reel hub (14) made of a plastic resin and a clamping piece (13) made of a plastic resin which is fitted into the concave portion. The concave portion (12) is defined by a bottom wall formed coaxial with the outer periphery of the reel hub and the right and left side walls (16), (17). Recesses (18), (19) are respectively formed near the bottom wall (15) in each of the right and left side walls (16), (17) and each recess is connected to each of undercut portion (20), (21) which extends toward the circular direction and the outer surface of the reel hub. It is desirable to form a pair of legs (22), (23) each extending outwardly from the concave portion with reference to the line passing to the center of the reel hub. That is, each leg extends in a direction spaced from the radial directon, on a side opposite the other leg. The reason will be described below.

On the other hand, an elastic clamping piece (13), fitted into the concave portion (12), is formed in one piece by a transverse rib (24) having the upper surface whose curvature is the same as that of the outer surface of the reel hub (14), a pair of legs (25), (26) each extending from the both ends of the transverse rib (24), and a pair of projections (27), (28) formed at each end of the legs so as to engage with the bottom wall (15) of the concave portion (12) and the legs (22), (23) of the side walls. It is preferable to form a certain gap between the leg (25) or (26) of the clamping piece and the end of the leg (22) or (23) of the side wall so that the legs of the clamping piece can be bent to some extent.

Figure 5:
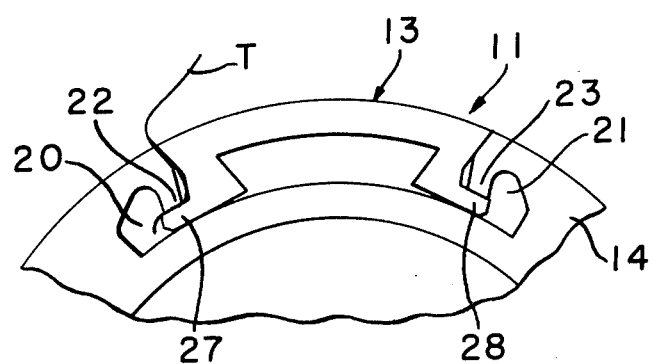
FIG. 5 is a front view in an assembled state of the clamping device of the present invention.

In the structure of the reel hub described above, when the end of a magnetic tape or a leader tape T is inserted into the concave portion (12) and the clamping piece (13) is forced into the concave portion as shown in FIG. 5, the clamping piece is snap-fitted into the concave portion (12) to clamp the tape T because of the elasticity of both the clamping piece and the legs (22), (23) formed in the side walls of the concave portion (12). Thus, the magnetic tape is certainly held by utilizing the elasticity of both the members. (In the FIG. 5, the magnetic tape is clamped on the left, rather than right side wall.)

In a magnetic tape cassette holding the reel hub (14) having the magnetic tape clamped as described above, when a tensile force is applied to the tail end or the top of the magnetic tape, the tape clamped between the projection (27) of the clamping piece and the leg (22) of the side wall is pulled outwards. The leg (22) having some elasticity is, however, slightly bent toward right because of a frictional force to the magnetic tape whereby the edge of the leg (22) is pressed on the upper surface of the projection (27) of the clamping piece to produce a greater frictional force. The pressing force is greater depending upon tensile strength to the magnetic tape thereby providing a reliable holding function for the magnetic tape.

In the embodiment, the magnetic tape is clamped by only one side of the clamping device. However, the magnetic tape can be clamped on both sides. An excellent clamping can be, however, obtained by a single clamping system.

As described above, a reliable clamping device can be attained by the present invention. For example, when the present invention is applied to the reel hub of a magnetic tape cassette requiring a high accuracy such as a microtape cassette, a reliable tape-clamping function is attained even though accuracy is slightly reduced.

What is claimed as new and desired to be secured by Letters Patent of the United States is:

1. In a circular reel hub formed of a resilient material, a magnetic tape clamping device comprising:
   a recess in a rim of said hub, said recess having a circular bottom and two circumferential ends;
   an undercut portion at each said end of said recess and adjacent said bottom, each said undercut portion extending into said hub and radially outward, each said undercut portion defining a portion of said hub as a leg extending toward said bottom in a longitudinal direction and terminating at a distal end spaced from said bottom by a portion of said undercut portion, wherein said longitudinal direction of each said leg defines a line passing a center of curvature of said circular bottom on a side opposite the other said leg; and
   a clamping piece having projections which, when said clamping piece is fitted in said recess, fit in said undercut portions between said bottom and said distal ends of said legs,
   whereby a tension force acting on a tape held between one of said projections and one of said distal ends will tend to distort the leg having said one of said distal ends such that said longitudinal direction of said leg approaches a radial direction so as to increase the frictional force between said bottom, said tape and said distal end.

* * * * *